Nov. 5, 1968  I. STAPSY  3,409,346

AFOCAL PROJECTION LENS ATTACHMENT

Original Filed July 21, 1964

LEGEND
R = RADIUS OF CURVATURE
E = THICKNESS
S = SPACING

INVENTOR
IRVING STAPSY
BY Robert Ames Norton
ATTORNEY

United States Patent Office 3,409,346
Patented Nov. 5, 1968

3,409,346
AFOCAL PROJECTION LENS ATTACHMENT
Irving Stapsy, 5737 Wilkins Ave.,
Pittsburgh, Pa. 15217
Original application July 21, 1964, Ser. No. 384,136. Divided and this application Apr. 18, 1966, Ser. No. 543,181
2 Claims. (Cl. 350—202)

ABSTRACT OF THE DISCLOSURE

An afocal attachment reducing an overall projector focal length by a factor of more than 3 is formed of spaced lens elements in positive and negative power groups, the negative power groups being as large or larger in diameter than the positive power groups. The last element grouping of the attachment is negative and spaced from the remaining lenses by a distance comparable to the total spacing of the remaining elements, which permits incorporating a small 45° folding mirror in the spacing to produce a right-angle change in the direction of the light beam from the attachment.

RELATED APPLICATIONS

This application is a division of my prior application Ser. No. 384,136, filed July 21, 1964, and now Patent No. 3,302,516, Feb. 7, 1967.

BACKGROUND OF THE INVENTION

It is common practice to project slides or motion pictures through a translucent screen. This provides high brightness and a cabinet which is of moderate size so that it can be designed to be portable. Two general types of such devices exist. In one case the projection is by a beam from the slide or motion picture projector entering the rear of a box with a front translucent screen. This device is very simple but, if screens of adequate size for use with an audience of a number of people are required, the dimensions of the box become quite large in order to provide a sufficiently long path from the projector to the screen to cover the screen of the desired size. Alternatively, if the dimensions are to be kept down from rear to front of the box, it is necessary to use an extremely short focus, special projector objective. This creates serious problems and limits the applicability of the device to certain projectors only. Another type has an opening in a side of the box with a 45° folding mirror. Here also the path length from the projector objective has to be fairly long and the mirror must be quite large, ordinarily of dimensions approximating those of the screen. Thus both forms result in relatively large boxes or cabinets which reduces portability unless special projectors with unusually short focus objectives are employed.

It should be noted that some elements are needed to assure that the image is correct. In the case of the side opening the 45° mirror performs both the function of folding and restoring the image on the screen which would otherwise be reversed. In the case of a rear opening some mirror structure is needed unless the film or slides in the projector are reversed.

The opening in the box has to be relatively large to provide sufficient path length from the projector objective to the screen. This introduces an additional problem, namely that of ambient light from the room entering the large opening.

When a special short focus projector objective is used this may not completely cover the slide or film frame and the sharply divergent cone of light in some cases strikes part of the projector. In such cases short focus projector objectives cannot be used. Even when they can be used it requires an additional objective which has to be changed and adds the problem of keeping track of a loose lens. Also, in many cases a special short focus projection lens may not utilize the condenser system of the projector as effectively and thus produce a dimmer projected picture.

SUMMARY OF THE INVENTION

The present invention eliminates all of the above drawbacks by providing the entrance opening of the box having the screen with a particular attachment, namely an afocal attachment which reduces the overall focal length of the system, including the projector, by a large factor, preferably more than three times. The attachment fills the opening so that the ambient light problem is no longer encountered. The projector uses its regular objective and the projector can be mounted quite close to the box for a given screen size and, in certain cases, may also provide for variable positions of the projector without refocusing. The afocal attachment of the present invention, which is also a new optical element has magnifying powers of approximately 4×. Whereas in the past afocal attachments have not been producible with magnifying powers significantly exceeding 2× and usually have lower powers. The high power of the afocal attachment permits quite short paths from projector objective to the display screen permitting much smaller enclosures and auxiliary surfaces such as mounting shelves for the projector. Greatly increased portability is achieved and at the same time clear bright pictures are obtained.

The present invention reduces dimensions regardless of which type of enclosure is employed for the screen. That is to say whether there is a rear opening or a side opening. The actual physical form of the afocal attachment will differ for the two types of uses as will be described in more detail below, but optically its organization is substantially similar.

While the system with the combination of the afocal attachment with the box and screen is not necessarily limited to an afocal attachment which reduces the overall focal length of the system by a factor of more than three, such an attachment is also a new optical system. It is characterized by the fact that the attachment is made up of spaced elements the negative elements in each group have diameters at least as large as any of the positive elements in the same group and a final large diameter group of elements having net negative power at the end of the objective, the spacing between groups being comparable with that of all of the spacing and thickness of individual lens elements of the attachment.

The limitations of spacing and larger diameter negative groups are of vital importance because if disregarded the mere fact that the magnification is as great or greater than three is not a new thing in afocal attachments. U.S. Patent 3,054,327 to Albrecht et al. shows such an attachment which is used for increasing the focal length of a system which operates with a factor up to 3. If such an attachment is reversed it is not useful because one of the principle negative groupings of lens elements is much smaller than the positive groups and so would reduce the field of view so greatly that if it were attempted to use a reversed Albrecht attachment in boxes, for which the present attachment is designed, the full area of slides or film frames could not be covered. The large spacing is of importance because it permits introduction into the attachment itself of a folding mirror of very small size which corrects projected picture reversal. This will be described in greater detail below:

In the case of the side opening enclosure, an additional advantage is achieved. Because of the large magnification of the afocal lens used, the beam to the screen is sharply divergent and a comparatively small folding mirror may be employed. This is of advantage as the smaller mirror reduces weight of the enclosure and also reduces costs as smaller mirrors are considerably cheaper than larger mirrors of comparable quality.

DESCRIPTION OF THE PREFERRED EMBODIMENTS

Figure 1:
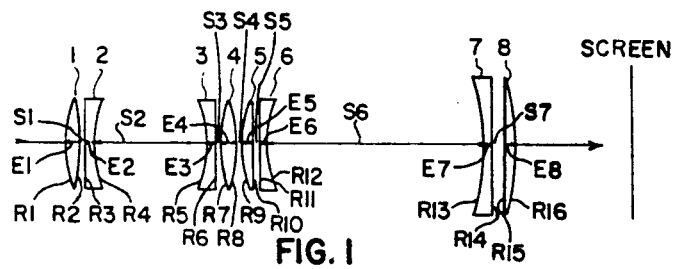
FIG. 1 is a diagrammatic representation of a straight afocal attachment of the present invention.

The afocal attachment of the present invention is composed of eight elements in three groups. The first group is a doublet with a positive lens 1 and a substantially planoconcave lens 2. The second group is composed of a concavoplane lens 3, a biconvex lens 4, a biconvex lens 5 and a substantially planoconcave lens 6. The third group is composed of a substantially planoconcave lens 7 and a biconvex lens 8. The diameter of the positive element groups in the drawings is approximately 1.2" and of the third negative group approximately 1.8". The attachment reduces overall focal length by just over 4 and the dimensions given work with a normal projector objective of 2" focal length and a speed of F2 for 16 millimeter films.

The spacings, curvature and refractive indices of the targets are shown in the following table:

TABLE I

| Lens | Material | | Radii | Thickness—Spacing | Actual Shape |
|---|---|---|---|---|---|
| | $N_d$ | $\nu$ | | | |
| 1 | 1.689 | 30.9 | $R_1$ +7.874 | $E_1$= .174 | Convex. |
| | | | $R_2$ −7.874 | | Do. |
| | | | | $S_1$= .004 | |
| 2 | 1.611 | 58.8 | $R_3$ +13.245 | | Do. |
| | | | $R_4$ +.871 | $E_2$= .118 | Concave. |
| | | | | $S_2$=2.103 | |
| 3 | 1.617 | 36.6 | $R_5$ −2.762 | $E_3$= .238 | Do. |
| | | | $R_6$ +26.645 | | Do. |
| | | | | $S_3$= .012 | |
| 4 | 1.617 | 54.9 | $R_7$ +26.916 | $E_4$= .130 | Convex. |
| | | | $R_8$ −1.389 | | Do. |
| | | | | $S_4$= .020 | |
| 5 | 1.689 | 30.9 | $R_9$ +4.661 | $E_5$= .168 | Do. |
| | | | $R_{10}$ −7.874 | | Do. |
| | | | | $S_5$= .004 | |
| 6 | 1.611 | 58.8 | $R_{11}$+13.245 | $E_6$= .118 | Do. |
| | | | $R_{12}$+.871 | | Concave. |
| | | | | $S_6$=2.103 | |
| 7 | 1.617 | 36.6 | $R_{13}$−2.762 | $E_7$= .238 | Do. |
| | | | $R_{14}$+26.645 | | Do. |
| | | | | $S_7$= .012 | |
| 8 | 1.617 | 54.9 | $R_{15}$−26.916 | $E_8$= .130 | Do. |
| | | | $R_{16}$−1.389 | | Convex. |

Figure 2:
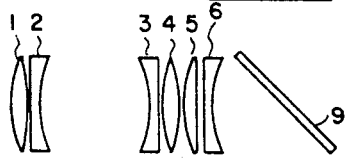
FIG. 2 is a similar diagrammatic showing of a folding afocal attachment.

The attachment of FIG. 1 transmits a beam straight through. For use with side opening enclosures, this is the form which is ordinarily applied. Where however a rear opening enclosure is desired, it is normally advantageous to arrange the projector at one side for additional compactness and this requires a right angle afocal attachment which is shown in FIG. 2 and which, in addition to the elements of FIG. 1 which bear their same reference numerals, is provided with a folding mirror element 9 so that the beam is folded before passing through elements 7 and 8 of the lens attachment. The curvatures, materials and spacings of the elements is the same in both figures. The mirror also corrects for reversal of the projected image.

Figure 3:
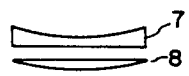
FIG. 3 is a diagrammatic representation of a side enclosure as used at present.
Figure 3:
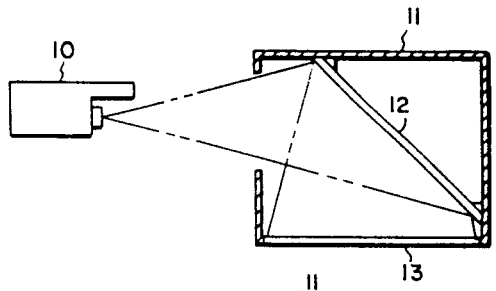

FIG. 3 shows a typical side opening enclosure. The projector is shown diagrammatically at 10 and the enclosure at 11. It will be seen that there is an opening on one side wall through which the projector beam enters. The translucent screen for the enclosure is shown at 13 and a large folding mirror at 12. This mirror is substantially the size of a diagonal of the enclosure and so is quite large and heavy. Also it will be seen that the projector 10 has to be at a considerable distance from the enclosure and if a unitary device is desired, which is the most practical form, the very large shelf or surface is needed in order to position the projector 10 at the suitable distance.

Figure 4:
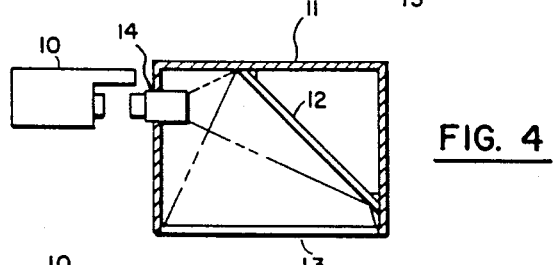
FIG. 4 is a similar view of an enclosure with an afocal attachment of the type shown in FIG. 1.

FIG. 4 shows an enclosure according to the present invention in which the same elements carry the same reference numerals. Now, however, the beam from the projector passes through the afocal attachment 14 which is of the design shown at FIG. 1. There is sharp magnification so that only a very small mirror 12 is needed in order to completely fill the translucent screen 13 which is of the same size as in FIG. 3. It will be seen that the projector is quite close to the enclosure and a much more compact arrangement results.

Figure 5:
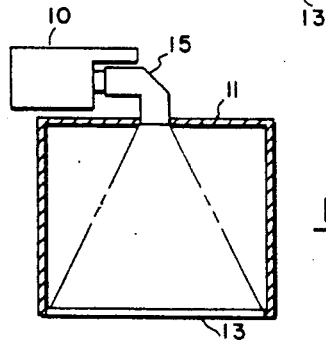
FIG. 5 is a section through an enclosure in which the beam enters from the rear and utilizes a folded afocal attachment of FIG. 2.

FIG. 5 illustrates the situation with an enclosure having an opening in the back. Here, however, the afocal attachment 15 is of the type shown in FIG. 2. No folding mirror is needed in the enclosure as the tiny folding mirror 9 in the attachment performs the same function. It will be seen that this form of enclosure permits a very compact total size as the projector is arranged on a narrow shelf at the rear of the enclosure, a considerable portion of the projector overlapping the enclosure. The greater compactness is obtained however at the cost of a slightly more expensive afocal attachment.

As has been pointed out above, the afocal attachments of the present invention are of high magnifying power. Preferably they should be substantially 4× although marked advantages in the overall projection system are obtained even with somewhat lower magnifications which can still be considerably larger than in the case of most hitherto known afocal attachments. Thus for example, magnifications from 2.5 up are useful and are included.

The enclosure with translucent screen is shown diagrammatically because this particular part of the invention need not differ significantly from standard enclosures except that of course when a side opening enclosure of the type shown in FIG. 4 is used the folding mirror may be much smaller. The present invention is of course not limited to any particular exact design or construction of enclosure and translucent screen, and it is an advantage of the invention that the improved results and compactness are obtained without requiring a special type of enclosure. In fact, it is possible to adapt the present invention to existing enclosures.

The greater compactness of the present invention is of primary importance where portable enclosures are used. These are usually in the form of an enclosure with shelf which may be folded down and are mounted on wheels or casters so that the unit can readily be moved from one part of a room to another. Normally such portable enclosures are stored in closets and therefore the greater compactness which the present invention permits a further advantage in reduction of storage space.

The lens dimensions and speed illustrated in the drawings are typically of a satisfactory device for the projection on a screen up to 3 by 4'. However, of course the same design of afocal attachment can be fabricated in various sizes and the invention is therefore not limited to the exact dimensions set forth above.

I claim:

1. An afocal attachment reducing overall projector focal length by a factor of more than 3, comprising stationary, spaced lens elements in three groups, a positive group, a second slightly positive group and a third negative group, each group including at least one positive and one negative lens element, the negative elements having diameters at least as large as any positive element in each group, the last group having a diameter larger than any positive lens grouping and the spacings between the first and second and between the second and third group each being comparable to the total spacings and thicknesses of the individual lens elements, the positive power of the two positive groups exceeding the power of the negative group sufficiently to produce a reduction of focal length of more than three.

2. An afocal attachment according to claim 1 in which a 45° mirror is incorporated in one of the spaces between element groups whereby the optic axis of the system is turned to 90° and the remaining elements are on the turned axis.

References Cited
UNITED STATES PATENTS

| | | | |
|---|---|---|---|
| 2,685,230 | 8/1954 | Baker | 350—202 X |
| 2,956,475 | 10/1960 | Harris et al. | 350—212 X |
| 3,212,398 | 10/1965 | Miller. | |
| 3,280,700 | 10/1966 | Donnelly et al. | |
| 2,716,920 | 9/1955 | Rosier | 350—212 X |
| 2,924,145 | 2/1960 | Landeau | 350—212 X |

JOHN K. CORBIN, *Primary Examiner.*